G. R. SPIVA.
STALK CUTTER.
APPLICATION FILED AUG. 9, 1912.
1,059,404.
Patented Apr. 22, 1913.
3 SHEETS—SHEET 3.
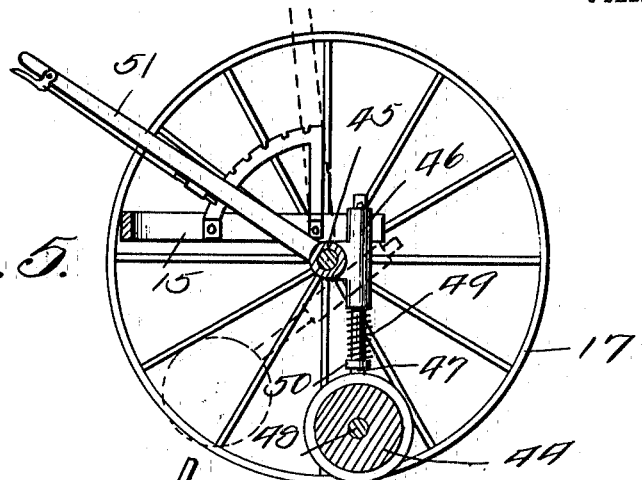
Fig. 5.
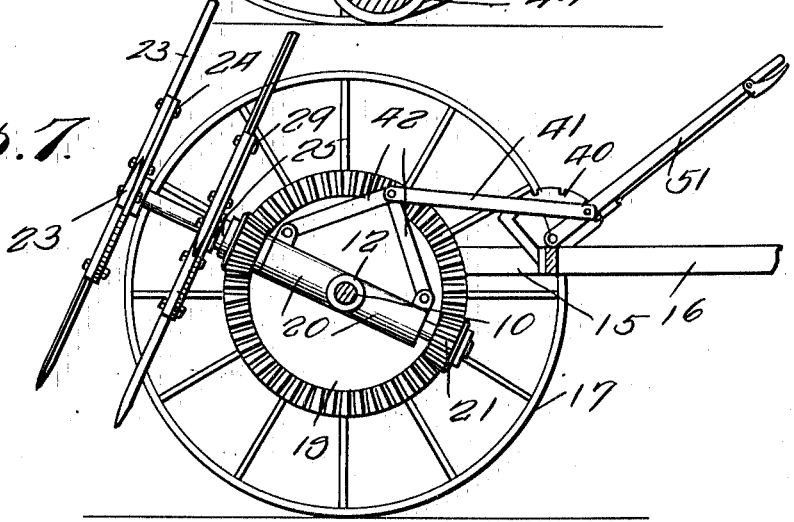
Fig. 7.
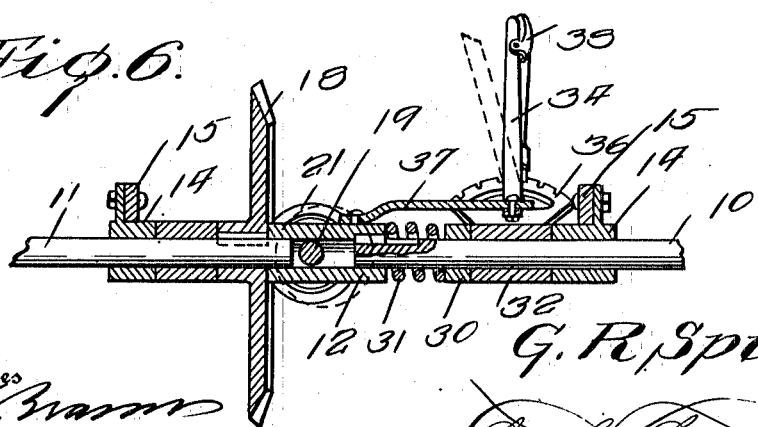
Fig. 6.
Witnesses
Inventor
G. R. Spiva
By 
Attorney

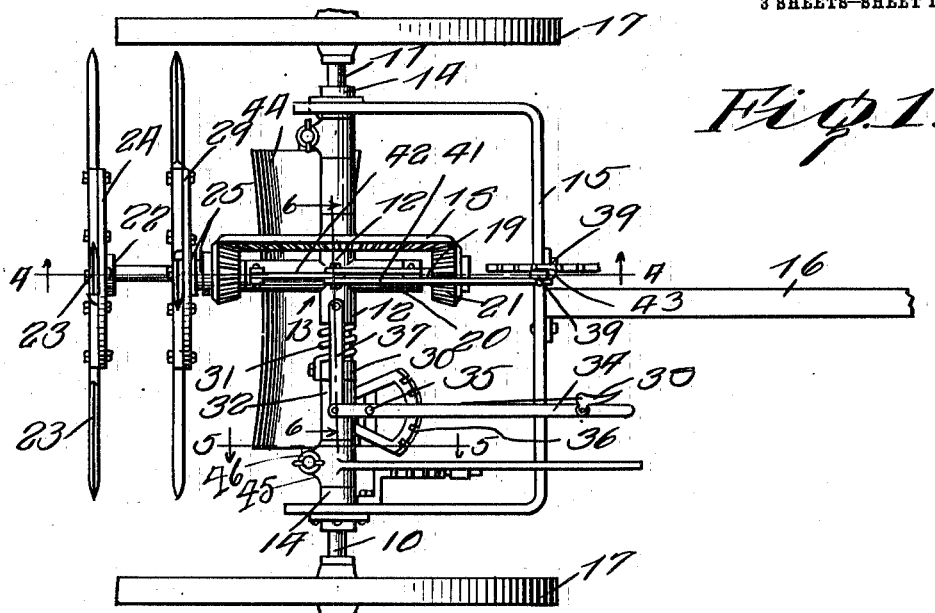

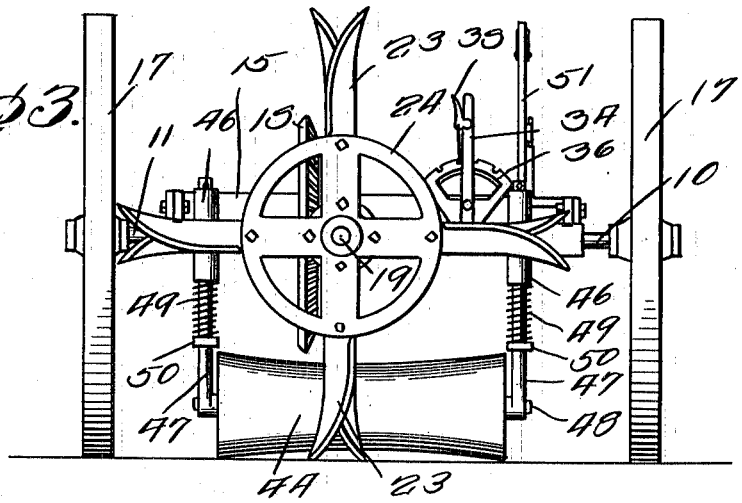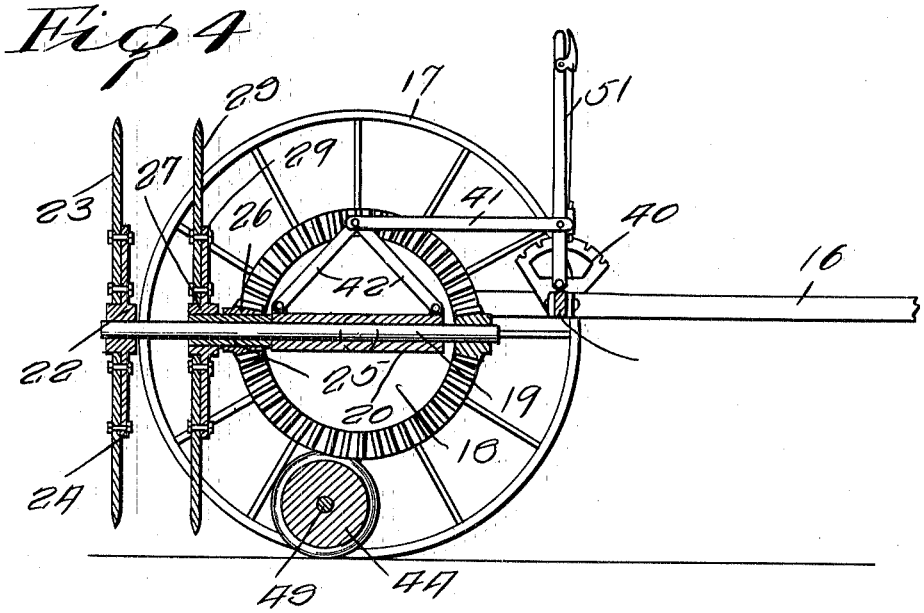

UNITED STATES PATENT OFFICE

GEORGE R. SPIVA, OF STEEDMAN, OKLAHOMA, ASSIGNOR OF ONE-HALF TO JAMES A. LAUGHLIN, OF STEEDMAN, OKLAHOMA.

STALK-CUTTER.

1,059,404.  Specification of Letters Patent.  Patented Apr. 22, 1913.

Application filed August 9, 1912. Serial No. 714,243.

*To all whom it may concern:*

Be it known that I, GEORGE R. SPIVA, a citizen of the United States, residing at Steedman, in the county of Pontotoc, State of Oklahoma, have invented certain new and useful Improvements in Stalk-Cutters; and I do hereby declare the following to be a full, clear, and exact description of the invention, such as will enable others skilled in the art to which it appertains to make and use the same.

This invention relates to stalk cutters and has for an object to provide a stalk cutter having a presser roller which works in advance of the cutting knives and holds down the stalks during the cutting operation.

A further object of the invention is to provide a stalk cutter having oppositely rotatable knives for operating upon the pressed down stalks.

A still further object of the invention is to provide means for raising and lowering the knives and for varying the pressure of the presser roller.

With the above objects in view the invention consists of certain novel details of construction and combination of parts hereinafter fully described and claimed, it being understood that various modifications may be made in the minor details of construction within the scope of the appended claims.

In the accompanying drawings forming part of this specification:—Figure 1 is a plan view of the stalk cutter. Fig. 2 is a side elevation of the stalk cutter. Fig. 3 is a rear elevation of the stalk cutter. Fig. 4 is a longitudinal sectional view taken on the line 4—4 Fig. 1. Fig. 5 is a longitudinal sectional view taken on the line 5—5 Fig. 1 showing the manner of varying the pressure of the presser roller. Fig. 6 is a cross sectional view taken on the line 6—6 Fig. 1 showing the manner of throwing the knives out of gear. Fig. 7 is a view similar to Fig. 4 showing the manner of raising the knives to released position, and Fig. 8 is a fragmentary plan view showing the clutch released.

Referring now to the drawings in which like characters of reference designate similar parts, the machine is shown to comprise an axle formed in two lengths 10 and 11, the inner ends being loosely fitted in the lateral branches 12 of a four-way coupling 13. A pair of sleeves 14 are mounted on the outer ends of the axle, and to these sleeves are terminally fixed the branches of the main frame 15 of the machine, the frame being substantially U-shaped in outline and being equipped with a draft tongue 16. Ground wheels 17 are fixed to the ends of the axle outside of the sleeves 14. Both lengths of the axle are rotated in the sleeves 14 and lateral branches of the four-way coupling 13, through the instrumentality of the ground wheels 17. Fixed to the length 11 of the axle is a bevel gear 18. A stub shaft 19 is revolubly fitted in the longitudinal branches 20 of the four-way coupling and is equipped in advance of the axle with a bevel pinion 21 which meshes with the bevel gear. The shaft is equipped at the rear end with a cutter comprising a hub 22 from which a plurality of radial blades 23 extend, the blades being connected by an annular ring 24 near the hub. A sleeve 25 is mounted on the stub shaft in rear of the axle and is equipped with a bevel pinion 26 which meshes with the bevel gear, 18, the sleeve being further equipped with a cutter similar to the above described cutter and comprising a hub 27 from which a plurality of blades 28 extend radially, the blades being connected by an annular ring 29.

Both of the above described cutters are rotated simultaneously in opposite directions by virtue of their driving pinions meshing with the bevel gear 18 on opposite sides of the axle.

For holding the cutters in gear, a sleeve 30 is fixed to the length 10 of the axle, and a helical spring 31 is seated on the axle between this sleeve and the adjacent lateral branch of the four-way coupling, the spring normally exerting a pressure upon the coupling sufficient to hold the pinions in mesh with the bevel gear. For throwing the cutters out of gear, a sleeve 32 is mounted on the length 10 of the axle and is anchored stationary to the frame by a link 33. An operating lever 34 is pivoted as shown at 35 to a notched standard 36 carried by the sleeve and is connected to the four-way coupling by a link 37. Upon the lever being shifted the four-way coupling is slid outwardly against the tension of the spring 31 and both pinions are disengaged from the bevel gear. A spring controlled pawl 38 carried by the operating lever engages the notched segment and serves to lock the lever in operative or released position.

The cutters may be rocked on the axle as a pivot into raised or lowered position by means of an operating lever 39 which is pivoted to a notched segment 40 carried by the draft 16 and is connected by means of a link 41 to the meeting ends of a pair of divergent links 42 which are terminally connected respectively to the sleeve 20. The cutters may be raised to released position by rocking the lever 39 forwardly, one of the links 42 during this movement of the lever serving to pull upwardly the rear end of the stub shaft 19 and the other serving to shove downwardly the front end of the stub shaft with a resultant rocking of the four-way coupling on the axle as a pivot and elevation of both cutters to raised position. A spring controlled pawl 43 carried by the lever 39 engages the notched segment 40 and locks the lever in operative or released position.

A presser roller 44 is suspended below the axle to press down the stalks in advance of the cutters, and to attain this end a pair of loose sleeves 45 are mounted on the lengths 10 and 11 of the axle and are equipped on the rear sides with tubular bearings 46. A pair of hanger rods 47 are slidably fitted in the bearings and are pivotally connected at the lower ends to the shaft 48 of the presser roller. Each hanger rod is encircled by a helical spring 49 which bears terminally against the lower end of the related tubular bearing and against a stop shoulder 50 on the rod, and exerts a downward pressure upon the roller.

For shifting the presser roller forward and backward, an operating lever 51 is fixed at the lower end to one of the sleeves 45. Upon rocking of this lever forward or backward the sleeve is rotated on the axle with a resultant shifting of the presser roller forward or backward. When the presser roller underlies the axle the pressure of the controlling spring 49 is greater than when the roller is disposed considerably in rear of the axle, hence by shifting the lever 51 the pressure of the presser roller upon the stalks may be varied.

In operation the stalks are first pressed down by the presser roller and then both rotary cutters advance over the stalks and chop the same into lengths corresponding to the distance apart of the cutters.

What is claimed, is:—

1. A stalk cutter including a wheeled frame, a plurality of clutch controlled cutters, means for simultaneously rotating said cutters in opposite directions, a spring controlled presser roller depending from said frame, and means for shifting said roller toward and away from said cutters.

2. A stalk cutter including a wheeled axle, a main frame carried thereby, a bevel gear on said axle, a stub shaft extending transversely of said axle, a pinion on said shaft meshing with said bevel gear, a sleeve on said shaft, a pinion on said sleeve meshing with said gear, a cutter fixed to and rotated by said shaft, and a cutter fixed to and rotated by said sleeve, said cutters rotating simultaneously in opposite directions.

3. A stalk cutter including a wheeled axle, a main frame carried thereby, a bevel gear on said axle, a transverse stub shaft secured for revoluble and sliding movement longitudinally of said axle, a pinion on said shaft meshing with said bevel gear, a rotary cutter fixed to said shaft, a sleeve on said shaft, a bevel pinion on said sleeve meshing with said gear, a rotary cutter on said sleeve, means for rocking said stub shaft on said axle to raise said cutter to released position, and means for sliding said rock shaft on said axle toward and away from said gear to engage and disengage said pinions from said gear.

In testimony whereof, I affix my signature, in presence of two witnesses.

GEORGE R. SPIVA.

Witnesses:
H. D. LAMBERT,
A. T. McANALLY.